Patented Dec. 19, 1950

2,534,562

UNITED STATES PATENT OFFICE 2,534,562

METHOD OF PREPARING ZINC SELENIDE

Soren M. Thomsen, Pennington, N. J., assignor to Radio Corporation of America, a corporation of Delaware No Drawing. Application April 28, 1948.
Serial No. 23,872

4 Claims. (Cl. 23—50)

This invention relates to an improved method of preparing zinc selenide and, more particularly, to a method of preparing this compound in pure form, utilizing a reaction which is complete in a brief period of time at ordinary temperatures.

Previously, this compound has been prepared by methods which have required many hours of heating and high temperatures since the reaction for the precipitation of zinc selenide is difficult to drive to completion. Previous methods have also been unsatisfactory from the standpoint of purity of the product obtained. It is well known that zinc selenide may be prepared so that it has luminescent properties. It is also well known that slight traces of impurities, when present in compositions which are intended to luminesce, will greatly lower the efficiency of the phosphor. Hence, it is important to be able to prepare a luminescent compound by a method which will not introduce objectionable impurities.

A principal object of the present invention is to provide an improved method for the preparation of pure zinc selenide.

Another object of the invention is to provide an improved method of preparing zinc selenide which can be carried out in a short period of time.

Another object of the invention is to provide a method of preparing zinc selenide which will result in a good yield at ordinary room temperatures.

In general, the present method consists in preparing a solution of selenium in sodium sulfite and then adding to this solution a strong reducing solution containing zinc ion and a hyposulfite. One example of a method for preparing the zinc selenide is given below.

Example

In order to prepare a one-third mole lot of zinc selenide, the following procedure may be used: First, the selenium reagent is prepared by dissolving 26 grams of selenium in one liter of molar $Na_2SO_3$ (126 grams) and filtering. Second, a hyposulfite-zinc solution is prepared by mixing 104 grams $NaHSO_3$ (1 mole), 60 grams glacial acetic acid (1 mole) and sufficient water to make 1 liter of solution. This second solution is allowed to flow through a 2" deep column of 40 mesh granular zinc contained in a filter and the clear effluent is allowed to flow directly into the selenium solution first prepared. Immediate precipitation of white zinc selenide occurs. Although not absolutely necessary, the precipitate may be rendered less voluminous and, therefore, easier to handle by heating the mixture for about an hour near 100° C. Even after this treatment, the precipitate may be too fine to filter. It may either clog on the filter or run through. Therefore, it is preferably washed by decantation, twice with distilled water, once with ammonium hydroxide (to remove zinc compounds other than selenide that may be present), and twice more with distilled water. The zinc selenide is finally obtained as a yellow residue by evaporating to dryness in an oven.

The reactions involved in the above method may be represented as follows:

The action of metallic zinc on acidified bisulfite solution is given by the following:

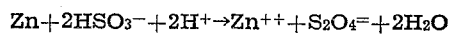

The reducing action of the hyposulfite on the selenium reagent may be written as follows:

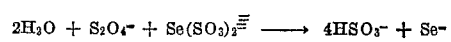

The $Se^=$ immediately precipitates ZnSe

Certain other precautions should be observed for best results. In the zinc column, a side reaction occurs which produces zinc sulfide. With new zinc in the column, some of this sulfide runs through the filter. After the zinc has been used once or twice, the zinc sulfide clings to the zinc and the solution comes through clear. The granular zinc needs to be removed from the column and washed free of the zinc sulfide occasionally. Because of these side reactions and since hyposulfite solutions are unstable when exposed to air, a 50% excess over the calculated theoretical amount of the bisulfide-zinc solution is preferably used in the above described process.

Although the above is the preferred method of preparing the zinc selenide, according to the present invention, it is possible to use sodium hyposulfite directly instead of preparing it in the zinc column. However, the disadvantage of this is that sodium hyposulfite obtained commercially is almost always of uncertain assay and purity. If this alternate method is used, a soluble compound of zinc and the negative radical of a weak acid, such as acetic acid, is preferably used as the source of the zinc ion.

It is also possible to carry out the above described processes for preparing zinc selenide without adding an acid to the bisulfite before reacting it with the zinc. In this case, however, much lower yields of the final product will be obtained. The reason appears to be that a pH of about 3 is the optimum for carrying out the reactions and this can be obtained only by adding a weak acid. If no acid is added, the reaction occurs much more slowly with the pH never dropping lower than about 4. Addition of a strong acid lowers the pH too far and large quantities of sulfur dioxide are liberated. When no weak acid is added to the reaction mixture and when the hyposulfite is used in previously prepared form, the zinc may be added in the form of a soluble salt—preferably the soluble salt of a weak acid such as zinc acetate, although salts such as zinc chloride may also be used with less satisfactory results.

The above described process is not a general one so far as reducing agents is concerned. Although various other strong reducing agents were tried in carrying out the method, only hyposulfiates were found to have the desired effect. Any soluble hyposulfite may be substituted for sodium hyposulfite, however.

In the example, stoichiometrical amounts of each reagent were given as the optimum amounts for making up the solutions. It will be realized that either more or less of each ingredient may be used with less satisfactory results because undesirable excess of certain ingredients will then be present in accordance with the laws of chemical equilibrium.

There has thus been described an improved method of preparing zinc selenide in pure form, which method is susceptible of some modifications within the range indicated. It is desired that the invention be limited as defined in the appended claims.

I claim as my invention:
1. A method of preparing zinc selenide which comprises preparing a solution of selenium in $Na_2SO_3$ and adding to this solution an acidified solution consisting essentially of a soluble hyposulfite, zinc ion and a weak acid whereby a precipitate of zinc selenide is obtained.

2. A method according to claim 1 in which said acidified solution is prepared by bringing a soluble bisulfite and said weak acid in contact with a layer of zinc.

3. A method according to claim 1 in which said precipitate of zinc selenide is filtered and washed, then dried in air.

4. A method of preparing zinc selenide which comprises preparing a first solution of selenium in $Na_2SO_3$ and adding to this solution a second solution consisting essentially of a soluble hyposulfite and zinc ion.

SOREN M. THOMSEN.

REFERENCES CITED

The following references are of record in the file of this patent:

UNITED STATES PATENTS

| Number | Name | Date |
|---|---|---|
| 2,176,495 | Gorden et al. | Oct. 17, 1939 |

OTHER REFERENCES

Mellor, "Comprehensive Treatise on Inorganic and Theoretical Chemistry," Longmans Green and Co., N. Y., 1925, vol. 10, page 778.

Rathke, Prakt. Chem. 95, 1, 1865.